(12) United States Patent
Odori

(10) Patent No.: US 10,094,479 B2
(45) Date of Patent: Oct. 9, 2018

(54) DEVICE FOR SEALING PIPELINES

(71) Applicant: TDW Delaware Inc., Wilmington, DE (US)

(72) Inventor: Mauro Odori, Castelfranco di Sopra (IT)

(73) Assignee: TDW Delaware, Inc., Wilmington, DE (US)

( * ) Notice: Subject to any disclaimer, the term of this patent is extended or adjusted under 35 U.S.C. 154(b) by 0 days.

(21) Appl. No.: 15/688,477

(22) Filed: Aug. 28, 2017

(65) Prior Publication Data

US 2018/0087679 A1    Mar. 29, 2018

Related U.S. Application Data

(63) Continuation of application No. 14/985,038, filed on Dec. 30, 2015, now Pat. No. 9,746,088.

(51) Int. Cl.
| | |
|---|---|
| *F16L 55/10* | (2006.01) |
| *F16K 7/20* | (2006.01) |
| *F16L 55/124* | (2006.01) |

(52) U.S. Cl.
CPC ............ *F16K 7/20* (2013.01); *F16L 55/124* (2013.01)

(58) Field of Classification Search
CPC .............................. F16L 55/124; F16L 55/132
USPC .............................. 138/94, 94.1, 89; 220/235
See application file for complete search history.

(56) References Cited

U.S. PATENT DOCUMENTS

| | | | |
|---|---|---|---|
| 1,137,344 | A | 4/1915 | McKenzie |
| 1,747,933 | A | 2/1930 | Goodman et al. |
| 2,588,188 | A | 3/1952 | Weisman |
| 3,457,959 | A | 7/1969 | Cooper |
| 4,040,450 | A | 8/1977 | Boundy |
| 4,202,377 | A | 5/1980 | Harrison |
| 5,297,581 | A | 3/1994 | Godfrey |
| 8,042,576 | B2 | 10/2011 | Peterson et al. |
| 2010/0243090 | A1 | 9/2010 | Peterson et al. |
| 2014/0283926 | A1 | 9/2014 | Duell |

FOREIGN PATENT DOCUMENTS

| | | |
|---|---|---|
| EP | 0462351 | 12/1991 |
| EP | 0488966 | 6/1992 |
| WO | 2010-055539 | 5/2010 |

*Primary Examiner* — Patrick F Brinson
(74) *Attorney, Agent, or Firm* — Gable Gotwals

(57) ABSTRACT

This inventions relates to a plugging machine and a rigid tube provided with a stationary disc integral with the bottom of the tube and oriented almost orthogonal to the tube, with a movable disc paired with the stationary disc. A sealing ring of a resilient material is located between the discs and compressed when the movable disc is pressed against the stationary disc to adhere to an inner surface of the pipeline. The sealing ring is coaxial with respect to the pipeline. The movement of the movable disc is determined by raising or lowering a control rod within the tube by means of sloping sliders made in the lower portion of the rod which engage in respective grooves, likewise sloping, made in an axial shank associated with the movable disc and sliding inside an axial opening of the stationary disc. A component of a force is generated which is parallel to the axis of the discs. The axis is raised or lowered by rotation of a threaded ring engaging in a threading mate at the top of the rod.

16 Claims, 3 Drawing Sheets

DEVICE FOR SEALING PIPELINES

CROSS REFERENCE TO RELATED APPLICATIONS

The present application is a continuation application claiming priority to U.S. patent application Ser. No. 14/985,038, filed on Dec. 30, 2015, which is incorporated herein by reference.

STATEMENT REGARDING FEDERALLY SPONSORED RESEARCH OR DEVELOPMENT

Non-applicable

NAMES OF THE PARTIES TO A JOINT RESEARCH AGREEMENT

Non applicable

REFERENCE TO A SEQUENCE LISTING

Non-applicable

DESCRIPTION OF THE INVENTION

The present invention relates to the technical field concerning the equipment for performing installation, repair and/or maintenance operations of pipelines, which carry fluids under pressure, for example gas, water, hydrocarbons and the like, without interrupting the service and avoiding the dispersion of polluting substances in the environment.

In particular, the apparatuses intended to operate on pipelines of medium dimensions are taken into consideration, for example those belonging to a distribution system, having the diameter of some inches, either below or above ground level, therefore excluding the domestic systems.

Such apparatuses are known as plugging machines and are installed in pairs, respectively upstream and downstream of the piece of pipeline to be acted upon, and joined with a temporary pipeline, so as to create a by-pass, into which the flow is deviated without being interrupted.

More in detail, the pipeline is perforated in two selected points, a connector and valve (called "flat valve" in jargon) are applied to each of the holes and then the respective plugging machines are fastened thereto; each of the latter includes a substantially bell-like, main body in which a plugging head is housed. The plugging head is lowered, by suitable means, made to pass through the flat valve and connector, so as to enter the underlying pipeline.

In the known solutions, the plugging head is lowered with its axis substantially orthogonal with respect to the pipeline and then rotated by 90°, so as to arrange it coaxial with the latter; afterwards, means are operated to move the two discs, provided at the head, close to each other. A sealing ring, made of rubber or the like, having for example a trapezoidal cross-section, is interposed between the two discs.

Due to the axial compression, the sealing ring expands radially, adhering strongly to the inner surface of the pipeline, thus making a seal. The passing fluid is forced to deviate within the main body of the plugging machine upstream, then to flow into the temporary pipeline and reach the plugging machine downstream, through which it is reintroduced into the pipeline via a reverse path.

From a constructive point of view, a plugging machine of known type presents the maximum complexity in the means which allow and control inclination of the plugging head.

These means must comply, both from the strictly dimensional point of view and from the functional point of view, with the means that move the discs, between which the sealing ring is interposed, close and away from each other.

Independently from the mechanical solutions chosen for the above mentioned means and from their bigger or smaller functional validity, it is obviously understood that the strength and reliability characteristics, which are obtained with considerable dimensions in case of big plugging machines, cannot be found in plugging machines suitable for medium dimension pipelines (in proportion to the necessary dimension reduction, thus to the inner diameter of the pipeline).

In other words, some technical solutions, valid for certain dimensioning, become poor with reduced dimensions.

BRIEF SUMMARY OF THE INVENTION

It is an object of the present invention to propose a device associated to a plugging machine for sealing pipelines, particularly simple and essential, so as to obviate the principal drawbacks reported by the known solutions.

Another object of the invention is to obtain a device which is indicated, due to its constructive characteristics, with medium-small dimensions of the pipelines into which it is to be introduced, for example, with a diameter of a few inches, and consequently of the plugging machine.

A still further object of the invention is to realize a strong device, which is very rigid, so as not to be adversely affected by the pressure of the fluid and to assure a correct and stable position inside the pipeline, thus an optimal tightness.

A still further object of the invention is to propose a compact device, which is easy to handle due to its limited weight and dimensions, quick to be installed and equally quick to be removed, to limit the total cost of the operations that require its use.

These and other objects are wholly obtained by a device for sealing of pipelines associated with a plugging machine, with the latter being of the type designed for the execution of maintenance and/or repair operations in the pipelines, in which fluids under pressure are conveyed, and aimed at being fastened to a connector made integral and communicating with one of the pipelines, perpendicular to its axis, with the above mentioned device protruding downward from the plugging machine and inserted within the pipeline and including:

- a rigid tube, supported by the body of the plugging machine and extended therebelow, so as to pass through the connector and insert into the pipeline with axis almost orthogonal thereto;
- a stationary disc, integral to the lower end of the rigid tube, arranged coaxial with the pipeline, provided with an axial through hole, with which the internal cavity of the same tube is set in communication and which has a face shaped like a truncated cone;
- a movable disc, arranged coaxial with and counter-facing the stationary disc, with a respective face having a truncated cone profile symmetrical to that of the face of the stationary disc, with the movable disc featuring an axial shank adapted to be inserted slidably in the axial hole of the stationary disc, so that the mutual distance between them can be adjusted;
- a sealing ring of elastomeric material, with a trapezoidal cross-section, interposed between the stationary and movable discs, the sealing ring having its outer diameter dimension slightly less than the internal diameter of the pipeline, in non-operating condition, in which the movable discs are not compressed axially, with the same stationary and movable discs mutually moved away, with the above mentioned ring expanding radially, in operating condition, in a manner as to adhere sealingly to the inner surface of the same pipeline, as a consequence of an axial compression exerted by mutual approaching of the discs;

a control rod, slidably inserted in the tube, extended upwards to come out from the body of the plugging machine and downwards to abut against the axial shank of the movable disc;

drive means, provided between the lower portion of the control rod and the shank of the movable disc, operated by axial translation of the rod to make the shank and the movable disc rigidly coupled therewith, carry out corresponding axial movements away from or close to the stationary disc, to determine respectively the non-operating and operating conditions of the sealing ring;

operating means, associated to the upper portion of the control rod, provided to cause the axial movements of the latter.

BRIEF DESCRIPTION OF THE DRAWINGS

The characteristics of the invention will become evident from the following description of a preferred embodiment of the device for sealing of pipelines under discussion, in accordance with the contents of the claims and with help of the enclosed figures, in which:

DETAILED DESCRIPTION OF THE INVENTION

Figure 1:
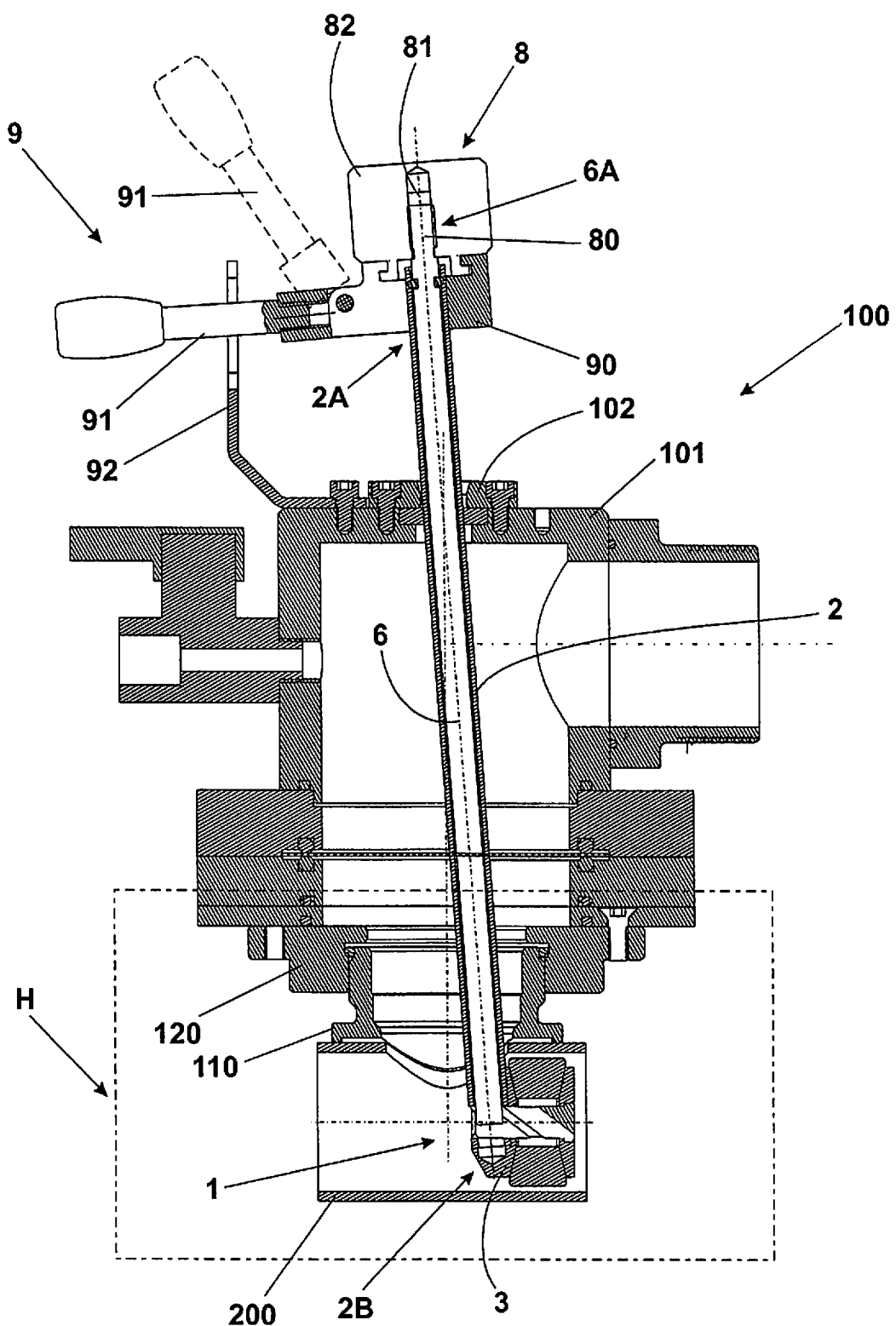
FIG. 1 is a schematic vertical cross-section of a plugging machine, provided with the sealing device under discussion associated to a pipeline.
Figure 2:
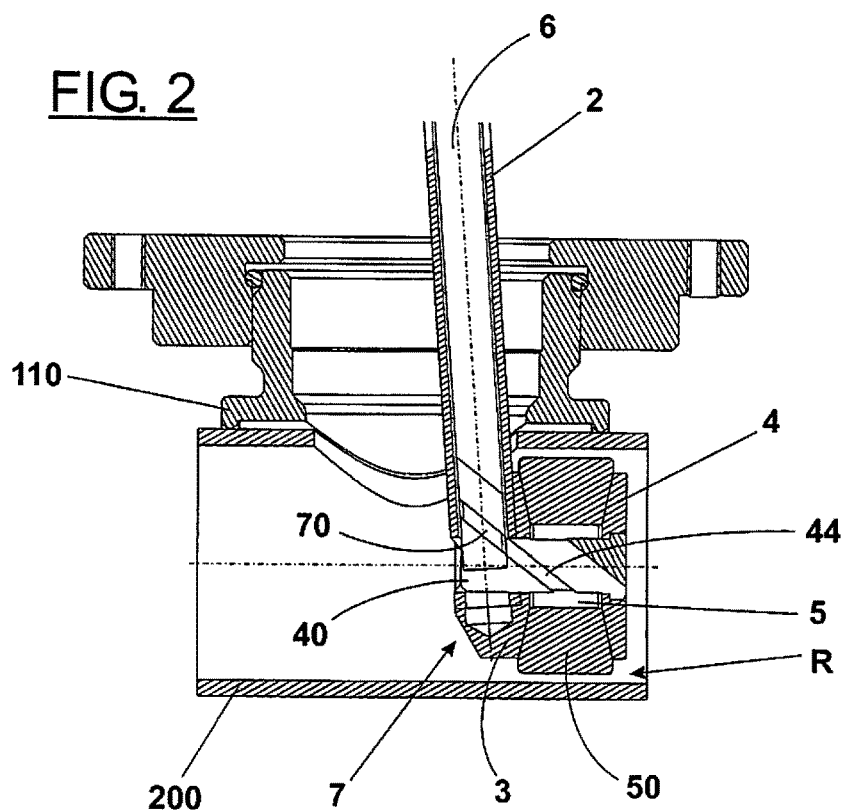
FIG. 2 illustrates, in enlarged scale, the detail H of FIG. 1, to point out the part of the device inserted in the pipeline, in non operating position.
Figure 3:
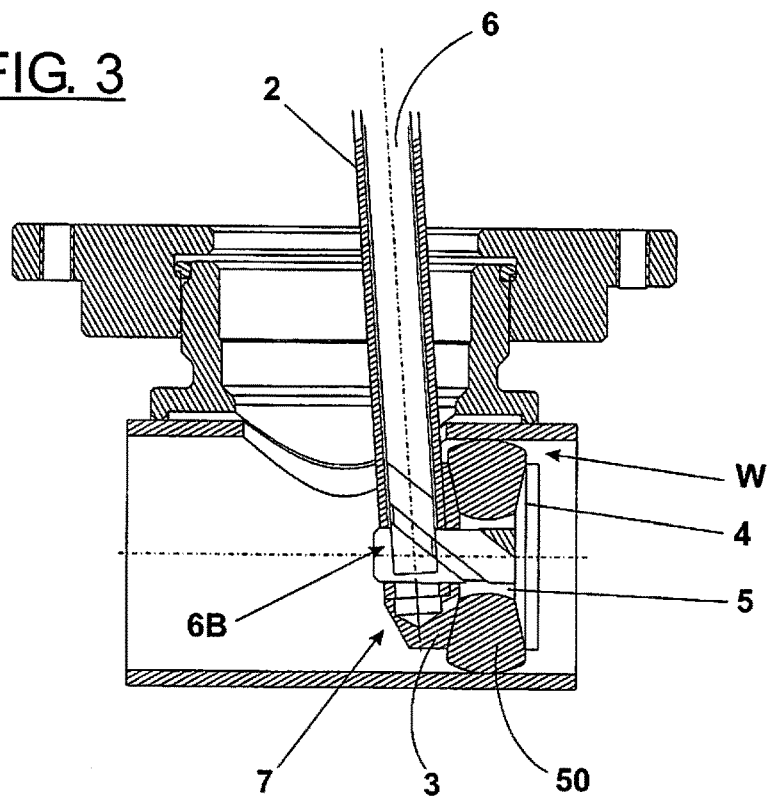
FIG. 3 is a view similar to that of FIG. 2, with the device in operative position.
Figure 4:
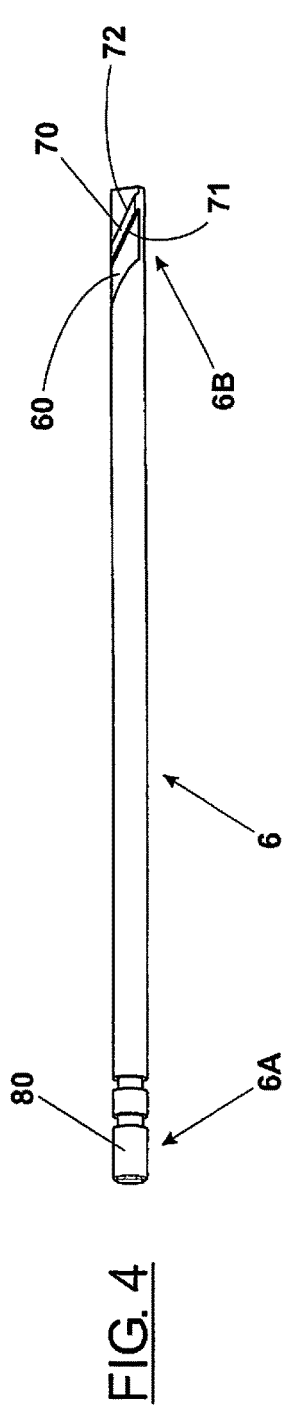
FIG. 4 is a perspective view of a control rod of the device.
Figure 6:
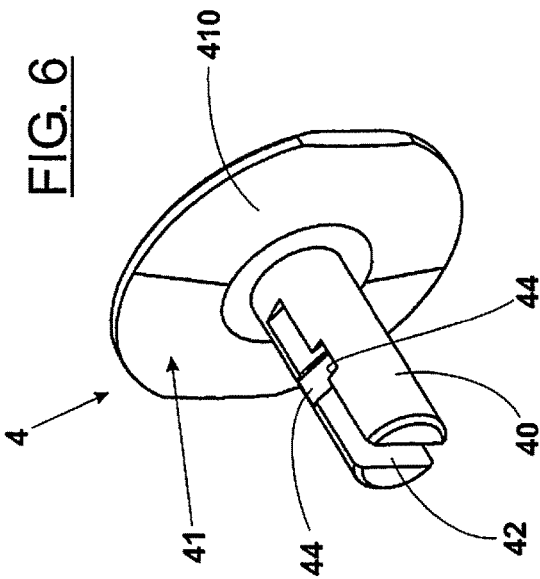
FIG. 6 is a perspective view of the movable disc of the previous Figure.
Figure 5:
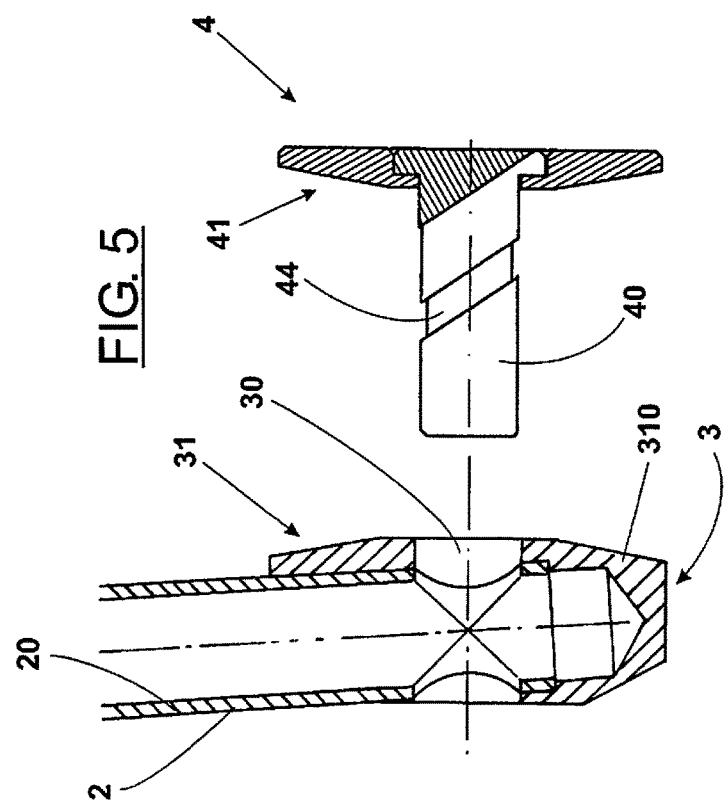
FIG. 5 is a cross-section view of a stationary disc of the device and a movable disc to be coupled with the stationary disc, moved away to be better pointed out.

The device 1 is provided in connection with a plugging machine 100 of substantially known type shown schematically in FIG. 1.

The plugging machine 100 is intended to be fastened to a connector 110, made integral and communicating with a pipeline 200 that conveys a fluid under pressure.

The plugging machine 100 is designed to cooperate with a twin machine (not shown) associated with the pipeline 200 to create a by-pass that isolates a piece of the pipeline without interrupting the flow to allow maintenance and/or repair operations in the piece.

According to the invention, device 1 includes a rigid tube 2 supported by a body 101 of the plugging machine 100 and extending therebelow to pass through the connector 110 and a flat valve 120 of known type associated to the same connector 110. In this way, the tube enters the pipeline 200 with an axis almost orthogonal to that of the latter.

In the non-limiting example shown in the figures, the tube 2 is inclined with respect to the condition of perpendicularity by about 4°.

The rigid tube 2 protrudes upwards from the body 101 passing through a collar 102, which assures the tightness against the leaks of the fluid in a known way not shown in detail.

A stationary disc 3 is integral, for example as a single body, with a lower end 2B of the rigid tube 2. Due to the positioning of the plugging machine 100 on the pipeline 200, the stationary disc 3 is arranged coaxial with the latter.

The stationary disc 3 is provided with an axial through hole 30 into which the internal cavity 20 of the tube 2 opens. The stationary disc 3 has a truncated cone-shaped face 31 opposite to the one facing the tube.

A first annular rim 310 is thus defined in the face 31, the inner part of which slightly protrudes with respect to the outer part.

The stationary disc 3 mates with a movable disc 4, arranged coaxial therewith, opposite thereto and featuring a face 41 with a truncated cone profile symmetrical to that of face 31 of the stationary disc 3.

Consequently, a second annular rim 410 is defined in the face 41 of the movable disc 4. An annular groove 5 having a trapezoidal cross-section is defined between the second annular rim 410 and the opposite first annular rim 310. The annular groove 5 houses a sealing ring 50 of elastomeric material, having a complementary trapezoidal cross-section, in such a way that its sides remain in contact with the first and second annular rim 310, 410.

The movable disc 4 is provided also with an axial shank 40 adapted to run slidably within the axial hole 30 of the stationary disc 3 so that the mutual distance between the discs, and accordingly the width of the annular groove 5, can be adjusted.

The external diameter of the sealing ring 50 is slightly smaller with respect to the inner diameter of the pipeline 200, in non-operating condition R, in which no axial compression is exerted on the discs, that is when the movable disc 4 is moved away from the stationary disc 3.

The ring 50 can expand radially in operating condition W in a manner as to adhere sealingly to the inner surface of the pipeline 200, due to an axial compression caused by moving closer of the discs 3, 4.

A control rod 6 is provided to control the movements of the movable disc 4 close to or away from the stationary disc 3 from outside of the plugging machine 100. The control rod 6 is introduced slidably into tube 2, extended upwards to come out from the body 101 of the machine 100 and downwards to abut against the axial shank 40 of the movable disc 4.

Drive means 7 are interposed between the lower portion 6B of the control rod 6 and shank 40 and are operated by axial translation of the rod 6 to make the shank 40 and the integral movable disc 4 carry out corresponding axial movements away from or closer to the stationary disc 3 and to determine respectively the non-operating condition "R" and operating condition "W" of the sealing ring 50.

The drive means 7 include at least a slider 70 projecting transversely from the control rod 6 and provided with two faces 71, 72 parallel to each other but sloping with respect to the longitudinal axis of the rod 6.

The slider 70 is aimed at engaging in a complementary groove 44 made in the shank 40 so that the axial thrust exerted on the rod 6, in one or the other direction, generates a component of a force parallel to the axis of discs 3, 4, by means of the contact surfaces 71, 72 of the slider 70 and the corresponding surfaces of the groove 44. Thus, according to the direction of this component, axial movements of the movable disc 4 away from or close to the stationary disc 3 are carried out.

In a preferred embodiment of the drive means 7, two parallel flat surfaces 60 are made in the lower portion 6B of the rod 6, from which two respective symmetrical sliders 70 protrude.

The shank 40 of the movable disc 4 features a longitudinal slit 42 arranged on a median plane of the shank 40, which is thus divided in two portions.

The facing faces of the slit 42 feature two of the above mentioned mirror-like grooves 44, within which the lower portion 6B of the rod 6 can be slidably introduced with its flat surfaces 60, and the two sliders 70 can engage with the corresponding grooves 44.

In order to obtain the movement of the movable disc 4 due to the raising and lowering of the rod 6, it is necessary that the inclination angle of the sliders 70 and the grooves 44 coupled mating therewith is suitably determined with respect to the axis of the discs 3, 4. The value of this angle is comprised between 55° and 60°.

Operating means 8, associated in the upper portion 6A of the control rod 6, can determine the axial translations of the rod 6 between two extreme positions corresponding to the non-operating condition "R" and operating condition "W" of the sealing ring 50.

In another embodiment, the operating means 8 include a threading 80 made in the upper portion 6A of the control rod 6 and aimed at meshing with a threaded hole 81 made in a screw ring 82, the latter being rotatably supported by the rigid tube 2 and designed to be manually operated to rotate, in one direction or in the other, to raise or lower the control rod 6.

Advantageously, the device 1 includes also anti-rotational means 9, associated to the rigid tube 2 adapted to stabilize the position of the latter and of the integral stationary disc 3 in a manner that the axis of the stationary disc 3, as well as the movable disc 4, coincide on a horizontal plane with that of the pipeline 200.

The anti-rotational means 9 are composed of, for example, a flange 90 locked at the upper end 2A of the tube 2 from which a bar 91 protrudes radially and the bar is aimed at introducing in a fork 92 fastened to the body 101 of the machine 100.

The figures illustrate a technical solution, according to which the bar 91 is hinged to the flange 90 to rotate upwards and release from the constraint of the fork 92. This feature is useful in the installation steps and removal of the plugging machine 100.

The present invention's simple and essential structure makes it suitable when the dimensions of the pipelines, in which it is to be introduced, are medium or medium-small, for example with a diameter of a few inches.

The device according to the invention is strong and very rigid due to the constructive solution of the tube which is made as a single body with the stationary disc.

In this way, a considerable resistance to the pressure exerted by the fluid is obtained and a correct and stable position inside the pipeline, and consequently an optimal tightness can be assured.

A special importance must be given to the conformation of the drive means which allow the movable disc to move close to and away from the stationary disc and consequently the sealing ring to be compressed and released. The solution of inclined sliders within likewise inclined grooves is very simple from a mechanical point of view, and, at the same time, it is effective in functional terms and extremely compact.

The combination of advantageous characteristics of the invention allows a compact and easy to handle device to be obtained due to its limited weight and dimensions, quick to be installed and equally quick to be removed so as to limit the total cost of the operation.

It is understood, however, that what has been described above is illustrative and not limiting, therefore, possible detail variations that could become necessary for technical and/or functional reasons, are from now considered within the protective scope as defined in the claims below.

The invention claimed is:

1. A device for the sealing of pipelines, the device comprising:
a plugging machine (100) including a body (101);
a rigid tube (2) supported by the body of the plugging machine and extended therebelow;
a stationary disc (3) integral to a lower end of the rigid tube and including an axial through opening (30) to which an internal cavity of the rigid tube is joined and which has a face (31) shaped like a truncated cone;
a movable disc (4) arranged coaxial with and counter-facing the stationary disc with a relative face (41) having a truncated cone profile symmetrical to that of the face of the stationary disc, the movable disc including an axial shank (40) adapted to be inserted slidably in the axial opening of the stationary disc, so that the mutual distance between them can be adjusted;
a sealing ring (50) of elastomeric material with a trapezoidal cross-section interposed between the stationary and movable discs and configured to expand radially outward when an axial compression is exerted on the stationary and moveable discs;
a control rod (6) slidably inserted in the rigid tube, extended upwards to come out from the body of the plugging machine and downwards to abut against the axial shank of the movable disc;
sliding drive means provided between a lower portion (6B) of the control rod and the axial shank of the movable disc, operated by axial translation of the control rod so as to make the axial shank and the movable disc move away from or close to the stationary disc the sliding drive means including two faces (71, 72) parallel to each other but sloping relative to a longitudinal centerline of the rigid tube, the faces configured to engage a complementary portion of the axial shank of the moveable disc; and
operating means (8), associated to an upper portion (6A) of the control rod, provided to determine axial movements of the control rod.

2. A device for sealing a pipeline passageway, said device comprising:
a rigid tube (2) having a longitudinal centerline oriented at an oblique angle relative to a vertical plane;
a stationary disc (3) located toward a lower end of the rigid tube and having a truncated cone profile;
a movable disc (4) located opposite the stationary disc and having a truncated cone profile facing that of the stationary disc (3), the moveable disc including a shank (40) passing through the stationary disc;
an elastomeric sealing ring (50) located between the stationary and moveable discs and having a side profile complementary to the truncated cone profile, respectively, of the stationary and movable discs;

at least one slider (70) projecting transversely from the rigid tube, the at least one slider including two faces (71, 72) parallel to each other but sloping relative to the longitudinal centerline of the rigid tube, the faces configured to engage a complementary portion of the shank;

wherein a force applied to the at least one slider causes axial movement of the moveable disc relative to the stationary disc.

3. The device of claim 2, further comprising:

a control rod (6) slidably inserted in the rigid tube tube and abutting against the axial shank of the movable disc.

4. The device of claim 2, further comprising:

operating means (8), associated to an upper portion (6A) of the control rod, provided to determine axial movements of the control rod.

5. The device according to claim 2 further comprising:

the stationary disc including an axial through hole (30);

the movable disc including a shank (40) adapted to be inserted slidably in said axial through hole (30) of the stationary disc.

6. The device according to claim 2, further comprising:

the elastomeric sealing ring moving between a retracted and an expanded state through an axial compression exerted on the moveable and stationary discs.

7. The device according to claim 2, the complementary portion of the shank including a groove (44).

8. The device according to claim 3, further comprising:

two parallel flat surfaces (60) in said lower portion (6B) of said control rod (6), said shank (40) of the movable disc (4) including a longitudinal slit (42) situated in a median plane of the shank (40), with said slit (42) containing grooves (44) configured to allow sliding insertion of said lower portion (6B) of the rod (6) with said flat surfaces (60) and engagement of the at least one slider (70) into the corresponding grooves (44).

9. The device according to claim 7, wherein said at least one slider (70) and groove (44) are inclined with respect to an axis of said stationary (3) and movable (4) discs by an angle in a range of 55° and 60°.

10. The device according to claim 4, wherein said operating means (8) include a thread (80) made in said upper portion (6A) of said control rod (6), intended to mesh with a threaded hole (81) formed in a threaded ring (82).

11. The device according to claim 2, further comprising:

a first annular rim (310) in a face (31) of the stationary disc (3), with an inner portion slightly protruding with respect to an external portion, and a second mirror-like annular rim (410) in a face (41) of the movable disc (4), and an annular groove (5) with a trapezoidal section between the same first and second annular rims (310, 410), the annular groove being designed to receive said sealing ring (50) with a complementary trapezoidal cross-section.

12. The device according to claim 2, wherein said rigid tube (2) and stationary disc (3) are made integral as a single body.

13. The device according to claim 2, wherein the longitudinal centerline of said rigid tube (2) is inclined with respect to an axis of said stationary disc (3) by an angle in a range of 3° and 6°.

14. The device according to claim 2, wherein anti-rotational means (9) are associated with said rigid tube (2) for stabilizing the position of the rigid tube and of the stationary disc (3), so that an axis of the stationary disc (3), as well as of said movable disc (4), coincide on a horizontal plane.

15. The device according claim 14, wherein said anti-rotational means (9) include a flange (90), locked to an upper end (2A) of said rigid tube (2), from which a bar (91) projects radially, adapted to enter a fork (92) of a body (101) of plugging machine (100).

16. A device according to claim 15, wherein said bar (91) is hinged with respect to said flange (90) and can rotate upwards to release itself from the constraint of said fork (92).

* * * * *